United States Patent [19]

Gaku et al.

[11] Patent Number: 4,871,811
[45] Date of Patent: Oct. 3, 1989

[54] HOT MELT ADHESIVE COMPOSITION

[75] Inventors: Morio Gaku, Saitama; Hidenori Kinbara, Tokyo, both of Japan

[73] Assignee: Mitsubishi Gas Chemical Company, Inc., Tokyo, Japan

[21] Appl. No.: 235,814

[22] Filed: Aug. 23, 1988

Related U.S. Application Data

[60] Division of Ser. No. 118,910, Nov. 10, 1987, Pat. No. 4,820,769, which is a continuation of Ser. No. 914,976, Oct. 3, 1986, abandoned.

[30] Foreign Application Priority Data

Oct. 3, 1985 [JP] Japan .................................. 60-219254
Oct. 30, 1985 [JP] Japan .................................. 60-241268
Feb. 17, 1986 [JP] Japan .................................. 61-30969

[51] Int. Cl.$^4$ ............................................. C08L 31/04
[52] U.S. Cl. ..................................... 525/148; 525/163; 525/185; 525/186; 525/282; 525/330.4; 525/330.5; 525/330.6
[58] Field of Search ............... 525/148, 163, 185, 186, 525/282, 330.4, 330.5, 330.6

[56] References Cited

U.S. PATENT DOCUMENTS

| 4,330,669 | 5/1982 | Ikeguchi | 525/289 |
| 4,369,304 | 1/1983 | Gaku | 525/185 |
| 4,370,467 | 1/1983 | Gaku | 525/185 |
| 4,396,745 | 8/1983 | Ikeguchi | 525/374 |
| 4,404,330 | 9/1983 | Ikeguchi | 525/374 |

Primary Examiner—Patricia Short
Attorney, Agent, or Firm—Sughrue, Mion, Zinn, Macpeak, and Seas

[57] ABSTRACT

A hot melt adhesive composition comprising (A) 99 to 80 wt % of a thermoplastic resin selected from the group consisting of a substantially amorphous thermoplastic saturated polyester resin, an ethylene-vinyl acetate copolymer and an ethylene-ethyl acrylate copolymer and (B) from 1 to 20 wt % of a monofunctional or polyfunctional cyanate ester compound having at least one cyanato group in the molecule is disclosed. The hot melt adhesive composition can further contain a co-modifier, a monofunctional or polyfunctional maleimide compound or a cross-linking catalyst for the thermoplastic resin (A). This composition has improved adhesive force, mechanical characteristics and heat resistance.

7 Claims, No Drawings

HOT MELT ADHESIVE COMPOSITION

This is a division of application Ser. No. 118,910, filed 11/10/87, now U.S. Pat. No. 4,820,769, which is a continuation of application Ser. No. 914,976, filed 10/3/86, now abandoned.

FIELD OF THE INVENTION

The present invention relates to a hot melt adhesive composition having an improved adhesive strength, and more particularly to a hot melt adhesive comprising a thermoplastic resin selected from the group consisting of a substantially amorphous or low-crystalline thermoplastic saturated polyester resin, an ethylene-ethyl acrylate copolymer and an ethylene-vinyl acetate copolymer, and cyanate ester compounds blended therewith. The hot melt adhesive composition has improved mechanical characteristics and heat resistance, and is used by applying it to a material to be adhered, in the form of a molded article, tape, melting adhesive, an adhesive sheet or a solution.

BACKGROUND OF THE INVENTION

A substantially amorphous thermoplastic saturated polyester resin (hereinafter referred to as "LPES" for brevity), an ethylene-ethyl acrylate copolymer (hereinafter referred to as "EEA" for brevity) and an ethylene-vinyl acetate copolymer (hereinafter referred to as "EVA" for brevity) are thermoplastic resins having excellent flexibility, rubber elasticity and low temperature characteristics and are widely used as a material to be blended with a wax, a base resin for hot melt adhesives and a molded product.

Hot melt adhesives prepared by mixing EEA or EVA with adhesives such as rosins, turpentine oil, polyisobutylene and paraffin, and waxes do not always have a sufficient adhesive force, and have the disadvantage that an adhesive force at high temperatures is poor. Hot melt adhesive composition comprising a substantially non-crystalline thermoplastic saturated polyester resin alone or a mixture of the substantially non-crystalline thermoplastic saturated polyester resin and an epoxy resin are known. This adhesive has practically acceptable properties such as adhesive properties and flexibility, but in many cases its adhesive force is poor.

Methods for preparing a composition having excellent adhesive properties by compounding a butadiene-acrylonitrile copolymer, polyvinyl acetate, dimeric acid-based polyamide, thermoplastic polyurethane, amorphous thermoplastic polyester and so forth to a thermosetting resin composition containing as a main component polyfunctional cyanate ester compounds which are the component (B) of the present invention are described in, for example, U.S. Pat. Nos. 4,396,745 and 4,404,330, and U.S. Patent Application Ser. No. 711,291, filed on Mar. 13, 1985, now U.S. Pat. No. 4,645,805. However, the object of those methods is to obtain a thermosetting composition containing the component (B) of the present invention as the main component. Although this composition exhibits excellent characteristics, it has the disadvantages that since a curing reaction of the component (B) is essential, a relatively long time is required for heat curing; since the composition is thermosetting, the storage stability over a long period of time is poor; and the cost is expensive.

As a result of extensive investigations on utilization of the unique properties of a cyanato group of a compound having a cyanato group ($-O-C \equiv N$), it has been found that the adhesive properties can be greatly improved by adding the compound having a cyanato group to resins for hot melt adhesive such as EVA, EEA and LPES.

SUMMARY OF THE INVENTION

Accordingly, an object of the present invention is to provide a hot melt adhesive composition comprising (A) from 99 to 80 wt % of a thermosetting resin selected from the group consisting of a substantially amorphous thermoplastic saturated polyester resin, an ethylene-vinyl acetate copolymer and an ethylene-ethyl acrylate copolymer and (B) from 1 to 20 wt % of a monofunctional or polyfunctional cyanate ester compound having at least one cyanato group in the molecule compounded therewith.

In a preferred embodiment, a monofunctional or polyfunctional maleimide compound or a crosslinking catalyst of the thermoplastic resin (A) is used as a co-modifier in an amount of from 0.1 to 5% by weight based on the weight of the hot melt adhesive composition, and the substantially amorphous thermoplastic saturated polyester resin having a number average molecular weight calculated from the number of terminal functional groups of from 5,000 to 22,000 and a softening point of from 40° to 140° C. is used.

DETAILED DESCRIPTION OF THE INVENTION

The ethylene-vinyl acetate copolymer (EVA) which can be used in the present invention is conventional ethylene-vinyl acetate copolymers having the vinyl acetate content of from 8 to 50 wt % and preferably from 25 to 40 wt %.

The ethylene-ethyl acrylate copolymer (EEA) which can be used in the present invention is conventional random copolymers prepared by copolymerizing ethylene and ethyl acrylate, and in which the ethyl acrylate content is 8 to 36 wt %.

The substantially amorphous thermoplastic polyester resin (LPES) which can be used in the present invention is prepared by polycondensating an aromatic or aliphatic di- or polycarboxylic acid and an aliphatic or alicyclic di- or polyol or its prepolymer, particularly an acid component containing terephthalic acid as a main component and a diol component containing ethylene glycol, propylene glycol or butanediol as a main component, in combination with other acids or diols while controlling the melting point, flowability characteristics, degree of crystallinity and so forth of the desired product. The softening point of the resin is generally 150° C. or less, preferably from 140° to 40° C. and more preferably from 120° to 60° C., and the degree of crystallinity determined by the X-ray method is generally 15% or less and most preferably 0%. In the present invention, the number average molecular weight calculated from the number of terminal functional groups is preferably from 1,500 to 25,000 and more preferably from 5,000 to 22,000 from standpoint of compatibility and the like. The number of free hydroxyl groups or carboxyl groups in LPES is preferred to be as small as possible because if an excess of free hydroxyl groups or carboxyl groups are present in LPES, these groups gradually react with the cyanato group of the component (B) even at room temperature, thereby deteriorating the storage stability of the hot melt adhesive composition.

Examples or the above aromatic or aliphatic di- or polycarboxylic acid are terephthalic acid, isophthalic acid, maloic acid, succinic acid, adipic acid, pimelic acid, spelic acid, azelaic acid, sebacic acid, their lower alkyl esters and acid anhydrides, and low molecular weight thermal decomposition products of a carboxyl group-terminated unsaturated polyester resin.

Examples of the aliphatic or alicyclic di- or polyol or its prepolymer are ethylene glycol, propylene glycol, 1,3-propanediol, 1,4-butanediol, 1,5-pentanediol, 1,6-hexanediol, neopentyl glycol, diethylene glycol, triethylene glycol, polyethylene glycol, polypropylene glycol, polybutylene glycol, polycaprolactonediol, 2,2-dimethylpropanediol, 2,2-bis(4-hydroxycyclohexyl)propane, 1,4-dihydroxymethylcyclohexane, trimethylolpropane, 1,2,3-trihydroxypropane and tetramethylolmethane. Low molecular weight compounds are preferably used to obtain low crystalline or non-crystalline resins.

Preferred examples of LPES are "POLYESTER" produced by Nippon Gosei Kagaku Kogyo Co., Ltd., "PES SERIES" produced by Toa Gosei Chemical Industry Co., Ltd., "VYLON" produced by Toyo Boseiki Co., Ltd., "KODAR PET" produced by Eastman Chemical Co., Ltd. and so forth which are commercially available.

As the component (A) of the present invention, a mixture of each LPES, EVA and EEA can be used if desired. In addition, conventional plastics such as vinyl chloride, polyethylene, polypropylene, an ethylene-propylene rubber and polycarbonate; conventional adhesives and waxes for hot melt adhesives, such as rosin, hydrogenated rosin, hydrogenated rosin ester, coumarone-indene resin, polyterpene, alkyd resin, petroleum hydrocarbon resin, xylene resin, phenolic resin, epoxy resin, paraffin, phthalic acid ester, phosphoric acid ester, chlorinated diphenyl, neoprene rubber and nitrile rubber; inorganic fillers such as calcium carbonate, aluminum hydroxide, calcium hydroxide, magnesium hydroxide, talc, clay, mica and wollastonite; powders, fibers or flakes of metals such as copper, iron, cobalt, nickel, chromium, aluminum and manganese, or their alloys; powders, fibers or flakes of copper oxide, iron oxide, lead oxide and so on; organic metal compound pigments such as copper phthalocyanine (phthalocyanine blue); inorganic pigments such as chrome yellow, mineral violet, carbon black, iron oxide, ultramarine, cobalt blue, cobalt violet and titan white; and additives such as platicizers, flame retardants, ultraviolet absorvers and stabilizers can be added to the component (A) of the present invention.

Referred monofunctional or polyfunctional cyanate ester compounds which can be used as the component (B) of the present invention are compounds represented by the formula

R(OCN)$_m$ wherein m is an integer of 1 or more, and preferably from 1 to 5, R is an aromatic organic group, and the cyanato group is bonded to the aromatic ring of the organic group.

Representative examples of the compounds represented by the above formula are monocyanatobenzene, 1,3- or 1,4-dicyanatobenzene, 1,3,5-tricyanatobenzene, 1,3-, 1,4-, 1,6-, 1,8-, 2,6- or 2,7-dicyanatonaphthalene, 1,3,6-tricyanatonaphthalene, 4,4'-dicyanatobiphenyl, bis(4-dicyanatophenyl)methane, 2,2-bis(4-cyanatophenyl)propane, 2,2-bis(3,5-dichloro-4-cyanatophenyl)propane, 2,2-bis(3,5-dibromo-4-cyanatophenyl)propane, bis(4-cyanatophenyl) ether, bis(4-cyanatophenyl) thioether, bis(4-cyanatophenyl)sulfone, tris(4-cyanatophenyl) phosphate, tris(4-cyanatophenyl) phosphite, cyanate esters obtained by the reaction of novolak and cyanogen halide (U.S. Pat. Nos. 4,002,755 and 3,448,079), and cyanate esters obtained by the reaction of hydroxy group-terminated polycarbonate oligomers and cyanogen halide (U.S. Pat. No. 4,026,913). In addition, cyanate esters as described in Japanese Patent Publication Nos. 1928/66, 18468/68, 4791/69, 11712/70, 41112/71, 26853/72, Japanese Patent Application (OPI) No. 63149/76 (the term "OPI" as used herein means a "published unexamined patent application"), U.S. Pat. Nos. 3,553,244, 3,755,403, 3,740,348, 3,595,900, 3,694,410 and 4,116,949, which are incorporated herein by reference, can also be used.

The above monofunctional or polyfunctional cyanate ester compounds can be used alone or they can be used as prepolymers which are obtained by adding co-modifiers as described hereinafter to the ester compounds and prereacting the mixture upon heating in the presence or absence of conventional catalysts. These prepolymers contain, as well as unreacted —OCN groups, a sym-triazine ring formed by trimerization of a cyan group, and have the number average molecular weight of from 300 to 6,000 and preferably 3,000 or less.

The hot melt adhesive composition of the present invention contains the above-described components (A) and (B) as essential components. A co-modifier, particularly a cross-linking catalyst to cross-link the component (A) of the present invention or the monofunctional or polyfunctional maleimide compound can be added in an amount of from 0.1 to 5% by weight based on the weight of the hot melt adhesive composition to improve its adhesive properties or impart other properties thereto.

Examples of the cross-linking catalysts to crosslink the component (A) are conventional catalysts such as organic peroxides, e.g., dicumyl peroxide, benzoyl peroxide, lauroyl peroxide, capryl peroxide, acetyl peroxide, p-chlorobenzoyl peroxide and di-tert-butyl-diperphthalate, and sulfur. Further examples thereof are organometallic salts such as lead naphthenate, lead stearate, zinc naphthenate, zinc octoate, tin oleate, dibutyl tin maleate, manganese naphthanate, cobalt naphthenate and metal chelates, such as iron acetylacetone which are co-catalyst for the above cross-linking catalysts.

The monofunctional or polyfunctional maleimide compounds are compounds having at least one N-maleimide group in the molecule. Representative examples thereof are phenyl maleimide, bis(4-maleimidophenyl)methane, bis(4-maleimidophenyl) ether, 1,1,-bis(4-maleimidophenyl)cyclohexane, 2,2-bis(4-maleimido-3-chlorophenyl)propane, 2,2-bis(4-maleimido-3,5-dibromophenyl) propane, 1,1-bis(4-maleimidophenyl)-1-phenylethane, and polymaleimides obtained by reacting polyamine which is prepared by reacting aniline and formalin so as to bond benzene rings through a methylene bond, and maleic anhydride.

Examples of other co-modifiers which can be used in the present invention are bisphenol A-type, phenol novolak-type, cresol novolak-type and other type epoxy resins; poly(meth)acrylates such as (meth)acrylate, polyfunctional (meth)acrylate, alkyl (meth)acrylate, and epoxy (meth)acrylate; polyallyl compounds and their prepolymers, such as diallyl phthalate, divinylbenzene, diallylbenzene, and trialkenyl isocyanurate; dicyclopentadiene and its prepolymers; a phenol resin; and the like.

The proportions of the components (A) and (B) in the hot melt adhesive composition are such that the amount of the component (A) is from 99 to 80 wt %, preferably from 95 to 85 wt %, based on the weight of the component (A) and the component (B), and the amount of the component (B) is from 1 to 20 wt % and preferably from 5 to 15 wt %, based on the weight of the component (A) and the component (B). If the amount of the component (B) is more than 20 wt %, a curing reaction is essential and a cured product tends to become hard. On the other hand, if the amount of the component (B) is less than 1 wt %, the improvement effect of the adhesive force is insufficient.

A method for mixing the component (A) of the present invention with the cyanate ester compound as the component (B) of the present invention, or further with a cross-linking catalyst as a co-modifier thereof, or a monofunctional or polyfunctional maleimide compound, is not particularly limited, and any method can be employed so long as those components are uniformly dispersed. Any conventional methods such as a method of mixing the above components with e.g., a blender, and using an extruder; a method of solution mixing and drying; a method of mixing with e.g., a kneader or a Henschel mixer, and using the mixture as such or after extrusion; a method in which an inorganic filler, a metal, a metal oxide or a pigment, and other additives are previously mixed with the co-modifiers of the present invention, and the resulting mixture is mixed with the component (A) and extruded; and a master batch method in which high concentration master batches are produced and those are mixed, can be used. In addition, a method in which the components (A) and (B) are dissolved in an organic solvent capable of dissolving the components (A) and (B), such as toluene and xylene, at room temperature or while heating to form a solution in a relatively emulsified condition is suitable. In this method, as mixing conditions, extrusion conditions of the component (A) can be used as such in the case of using an extruder. This mixing is carried out at room temperature or under heating.

The hot melt adhesive composition of the present invention prepared by the above method is molded into molded articles such as plates, pellets, sheets, films, rods or the like by a method such as press molding, extrusion molding and injection molding, and is used to form an adhesive layer or a film for bonding, using a solution of mixture with solvent.

Bonding conditions using the hot melt adhesive composition of the present invention vary depending upon the type of the composition components used or the like, but are generally at temperatures of from 90° to 250° C. for from 5 seconds to 30 minutes. It is preferred to apply a pressure at the time of bonding. The pressure applied is generally from 0.1 to 500 kg/cm$^2$ and preferably from 5 to 150 kg/cm$^2$.

The present invention is described in greater detail by reference to the following examples and comparative examples. All parts are by weight unless otherwise indicated.

EXAMPLE 1

As the thermoplastic resin (A) for a hot melt adhesive composition, three types of LPES ("PES 110H" and "PES 170", produced by Toa Gosei Chemical Industry co., Ltd., "LP 035" (number average molecular weight: 16,000, hydroxyl value: 6 mg.KOH/g), produced by Nippon Gosei Kagaku Co., Ltd.; hereinafter referred to as "110H", "170" and "LP 035", respectively) were used; as the cyanate ester compound (B), a product having a weight average molecular weight of about 300 (hereinafter referred to as "BT 1003") prepared by pre-mixing 90 parts of 2,2-bis(4-cyanatophenyl)propane (hereinafter referred to as "BPACN" and 10 parts of bis(4-maleimidophenyl)methane (hereinafter referred to as "BMI") at 130° C. for 30 minutes, and a product having a weight average molecular weight of about 2,000 (hereinafter referred to as "BT 2020") prepared by pre-reacting 80 parts of 1,4-dicyanatobenzene and BMI at 150° C. for 3 hours were used; and as a co-modifier, dicumyl peroxide (hereinafter referred to as "DCPO") and rosin were used.

These components were used as shown in Table 1 below and mixed in a kneader under conditions of 80° C. and 30 minutes in the tests other than Test Nos. 13 to 15 and under conditions of 100° C. and 30 minutes in Test Nos. 13 to 15 to produce hot melt adhesive compositions.

The above produced hot melt adhesive compositions and LPES alone for the sake of comparison were measured for adhesive strength.

In measurement of the shear adhesive strength ($\sigma_T$, kg/cm$^2$), an adhesive layer was formed on a 15 mm long end portion of a soft iron plate having a thickness of 2 mm and a width of 25 mm in a thickness of 100 μm and bonded under conditions of 180° C., 3 minutes and 5 kg/cm$^2$ to produce a test piece.

In measurement of the peel strength ($\sigma_S$, kg/cm), an adhesive layer was formed in a thickness of 150 μm between 100 μm thick aluminum foils and the composite was bonded under conditions of 160° C., 30 minutes and 5 kg/cm$^2$ to produce a test piece. Using this test piece, both ends of the bonded foils were peeled off.

The results obtained are shown in Table 1 below.

TABLE 1

| Test No. | LPES Type | LPES Parts | Co-Modifier Type | Co-Modifier Parts | Aids Type | Aids Parts | $\sigma_T$ (kg/cm$^2$) | $\sigma_S$ (kg/cm) |
|---|---|---|---|---|---|---|---|---|
| 1 | 110 H | 100 | BPACN | 5 | | | 65 | |
| 2 | " | " | " | 10 | | | 98 | |
| 3 | " | " | " | 20 | | | 140 | |
| 4 | " | " | BT1003 | 5 | | | 70 | |
| 5 | " | " | " | 10 | | | 105 | |
| 6 | " | " | " | 20 | | | 169 | |
| 7 | " | " | BT2020 | 5 | | | 98 | |
| 8 | " | " | " | 10 | | | 136 | |
| 9 | " | " | " | 20 | | | 185 | |
| 10 | " | " | BT1003 | 5 | DCPO | 1 | 69 | |
| 11 | " | " | " | 10 | " | 1 | 122 | |
| 12 | " | " | " | 20 | " | 1 | 175 | |
| 13 | 170 | " | " | 5 | | | 79 | |
| 14 | " | " | " | 10 | | | 116 | |
| 15 | " | " | " | 20 | | | 182 | |
| 16 | LP035 | " | " | 5 | | | 72 | 2.0 |
| 17 | " | " | " | 10 | | | 104 | 2.5 |
| 18 | " | " | " | 20 | | | 169 | 2.7 |
| 19 | 110 H | " | | | | | 44 | |
| 20 | " | " | | | Rosin | 5 | 46 | |
| 21 | " | " | | | " | 20 | 0 | |
| 22 | 035 | " | | | | | 38 | 0.5 |

Test Nos. 1–18: Invention
Test Nos. 19–22: Comparison

EXAMPLE 2

EVA (produced by Mitsui Polychemical Co., Ltd., trade name, "EVAFLEX #250", vinyl acetate content: 28%, melt index (=MFR, ASTM D1238 method): 15 g/10 min) was mixed with a roll maintained at 90° C.. BPACN, BMI, DCPO, rosin, or solid paraffin (produced by Nippon Seirou Co., Ltd., 145° F. paraffin wax) was added to 100 parts of EVA in an amount as shown in Table 2 and then kneaded with a roll for 10 minutes. The resulting mixture was press molded under conditions of 100° C., 30 kg/cm$^2$ and 1 minute to produce a sheet having a thickness of 0.3 mm.

This sheet was interposed between 100 μm thick polyethylene terephthalate (hereinafter referred to as "PET") films and the laminate was bonded by press molding under conditions of 30 kg/cm$^2$, 180° C. and 3 minutes.

The peel strength ($\sigma_{S,180}$, kg/25 mm) between the above bonded PET films at a 180° C. angle was measured, and the results obtained are shown in Table 2 below.

TABLE 2

|  | Test Nos. | | | | | | | |
|---|---|---|---|---|---|---|---|---|
|  | 1 | 2 | 3 | 4 | 5 | 6 | 7 | 8 |
| BPACN | 10 | 9 | 9 | 18 |  |  | 30 |  |
| BMI |  | 1 | 1 | 2 |  |  |  |  |
| DCPO | 1 | 1 | 1 | 1 | 1 |  |  | 1 |
| Rosin |  |  |  |  |  | 20 |  |  |
| Paraffin |  |  | 10 |  |  |  | 30 |  |
| $\sigma_{S,180}$ (kg/25 mm) | 12 | 17 | 8 | 8 | 3 | 0 | 1 | 0 |

Test Nos. 1-4: Invention
Test Nos. 5-8: Comparison

EXAMPLE 3

To 100 parts of EVA (produced by Mitsui Polychemical Co., Ltd., trade name, "EVAFLEX #40", vinyl acetate content: 40%, MFR: 55 g/10 min) were added a prepolymer having a weight average molecular weight of 1,500 (hereinafter referred to as "BT1015") prepared by pre-reacting 9 parts of BPACN and 10 parts of BMI as shown in Table 3 at 140° C. for 2 hours, and DCPO. The resulting mixture was kneaded with rolls maintained at 80° C. for 10 minutes and then press molded for 1 minute at 5 kg/cm$^2$ with a press maintained at 80° C. to produce a film having a thickness of 150 μm.

The above produced film was interposed between 100 μm thick PET films, and the laminate was bonded by press molding under conditions of 5 kg/cm$^2$, 180° C. and 3 minutes. The peel strength of the film bonded surface was measured in the same manner as in Example 2.

The results obtained are shown in Table 3 below.

TABLE 3

|  | Test Nos. | | | |
|---|---|---|---|---|
|  | 1 | 2 | 3 | 4 |
| EVA | 100 | 100 | 100 | 100 |
| BT1015 | 10 | 10 | 18 | 18 |
| DCPO | 0 | 1 | 0 | 1 |
| $\sigma_{S,180}$ (kg/25 mm) | 15 | 17 | 10 | 12 |

Test Nos. 1-4: Invention

A roll kneaded composition obtained in the same manner as in Test No. 2 was dissolved in toluene at 80° C. to prepare a solution having a solid concentration of 25%.

This solution was coated on one surface of a 100 μm thick aluminum foil and dried at 130° C. for 5 minutes to form a 60 μm thick coating. A 100 μm thick aluminum foil was placed on the coating side of the above aluminum foil and pressed at 160° C. and a pressure of 5 kg/cm$^2$ for 15 minutes. The peel strength was measured in the same manner as above and was 11 kg/25 mm.

EXAMPLE 4

BT1015, DCPO, rosin and solid paraffin were added as shown in Table 4 to EVA (produced by Mitsui Polychemical Co., Ltd.; trade name, "EVAFLEX #220", vinyl acetate content: 28%; MFR: 150 kg/10 min) and kneaded for 10 minutes with rolls maintained at 70° C.. The resulting mixture was extruded from a T die maintained at 180° C. in a thickness of 60 μm and placed on a 50 μm thick iron foil to form a layer having a thickness of 60 μm. Immediately a 50 μm thick iron foil was superposed on the layer. The resulting laminate was passed between rolls of 180° C. and 25 kg/cm at a speed of 1 m/min and then allowed to stand at room temperature.

The peel strength was measured in the same manner as in Example 2. The results obtained are shown in Table 4 below.

TABLE 4

|  | Test Nos. | | | | | | |
|---|---|---|---|---|---|---|---|
|  | 1 | 2 | 3 | 4 | 5 | 6 | 7 |
| EVA | 40 | 40 | 40 | 40 | 40 | 40 | 40 |
| BT1015 | 0 | 0 | 0 | 5 | 10 | 10 | 10 |
| DCPO | 0 | 1 | 1 | 1 | 0 | 1 | 1 |
| Rosin | 40 | 40 | 40 | 40 | 40 | 40 | 40 |
| Paraffin | 20 | 20 | 0 | 0 | 0 | 0 | 5 |
| $\sigma_{S,180}$ (kg/25 mm) | 2 | 1 | 3 | 11 | 10 | 12 | 6 |

Test Nos. 1-3: comparison
Test Nos. 4-7: Invention

EXAMPLE 5

To 100 parts of EVA (trade name, "EVAFLEX" #150) were added a prepolymer having a weight average molecular weight of 2,000 (hereinafter referred to as "BT1020") prepared by pre-reacting 90 parts of BPACN and 10 parts of BMI at 140° C. for 4 hours as shown in Table 5 and benzoyl peroxide (hereinafter referred to as "BPO"). The resulting mixture was kneaded with rolls maintained at 80° C. for 8 minutes and then press molded for 1 minutes at 20 kg/cm$^2$ using a press maintained at 80° C. to produce a film having a thickness of 150 μm.

The above produced film was interposed between a 100 μm thick aluminum foil, a 50 μm thick copper foil, a polycarbonate film, a polysulfone film and a polyimide film, and the laminate was then bonded by press molding under conditions of 20 kg/cm$^2$, 160° C. and 3 minutes.

The peel strength was measured in the same manner as in Example 2. The results obtained are shown in Table 5 below.

TABLE 5

|  |  | Test Nos. | | |
|---|---|---|---|---|
|  |  | 1 | 2 | 3 |
| Composition: | EVA | 100 | 100 | 100 |
|  | BT1020 | 3 | 6 | 10 |
|  | BPO | 1 | 1 | 1 |

TABLE 5-continued

|  |  | Test Nos. | | |
|---|---|---|---|---|
|  |  | 1 | 2 | 3 |
| $\sigma_{S, 180}$ (kg/25 mm) | Al foil | 7 | 10 | 12 |
|  | Cu foil | 6 | 9 | 11 |
|  | Polycarbonate film | 3 | 5 | 6 |
|  | Polysulfone film | 3 | 5 | 6 |
|  | Polyimide film | 4 | 6 | 7 |

Test Nos. 1–3: Invention

EXAMPLE 6

EEA (produced by Mitsui Dupont Polychemical Co., Ltd.; trade name, "EVAFLEX-EEA, 709A"; ethyl acrylate content: 35%; random copolymer, hereinafter referred to as "EEA709") was kneaded using rolls maintained at 80° C.. To 100 parts of EEA 709 were added, as shown in Table 6, a prepolymer having a weight average molecular weight of 2,000 (hereinafter referred to as "BPAC20") prepared by pre-reacting BPACN and BPACN at 140° C. for 8 gours, RT1015, and rosin or DCPO. The mixture was then kneaded at 80° C. for 10 minutes using rolls, and molded into a 200 μm thick film using rolls maintained at 80° C.

This film was interposed between 100 μm thick PET films and bonded therebetween by press molding under conditions of 5 kg/cm², 180° C. and 3 minutes.

The peel strength was measured in the same manner as in Example 2. The results obtained are shown in Table 6 below.

TABLE 6

|  | Test Nos. | | | | | | | | | | |
|---|---|---|---|---|---|---|---|---|---|---|---|
|  | 1 | 2 | 3 | 4 | 5 | 6 | 7 | 8 | 9 | 10 | 11 |
| Modifier (parts) | | | | | | | | | | | |
| BPACN |  |  |  | 10 | 20 |  |  |  |  |  |  |
| BPAC20 |  |  |  |  |  | 10 | 10 |  |  |  |  |
| BT1015 |  |  |  |  |  |  |  | 10 | 20 | 30 | 10 |
| co-modifier | | | | | | | | | | | |
| Rosin |  |  | 10 |  |  |  |  |  |  |  |  |
| DCPO |  | 1 |  |  | 1 |  | 1 |  |  |  | 1 |
| $\sigma_{S, 180}$ (kg/25 mm) | 0 | 0 | 0 | 6 | 9 | 7 | 10 | 8 | 8 | 8 | 10 |

Test Nos. 1–3 and 10: Comparison
Test Nos. 4–9 and 11: Invention

EXAMPLE 7

A 200 μm thick film was produced using the components shown in Table 7 in the same manner as in Example 6. This film was interposed between 100 μm thick aluminum foils, between 50 μm thick copper foils, between polysulfone films, between polyetherimide films, or between polyetheretherketone films and bonded by press molding under conditions of 20 kg/cm², 190° C. and 1 minute.

The peel strength was measured in the same manner as in Example 2. The results obtained are shown in Table 7 below.

TABLE 7

|  | Test Nos. | | |
|---|---|---|---|
|  | 1 | 2 | 3 |
| Components (parts) | | | |
| EEA709 | 100 | 100 | 100 |
| BPACN | 10 |  |  |
| BT1015 |  | 10 | 10 |
| Arukon P-100*¹ |  |  | 10 |
| DCPO | 1 | 1 | 1 |
| $\sigma_{S, 180}$ | | | |

TABLE 7-continued

|  | Test Nos. | | |
|---|---|---|---|
|  | 1 | 2 | 3 |
| (kg/25 mm) | | | |
| Al foils | 10 | 11 | 9 |
| Cu foils | 10 | 11 | 9 |
| Polysulfone film | 5 | 6 | 6 |
| Polyetherimide film | 5 | 5 | 6 |
| Polyetheretherketone film | 5 | 5 | 6 |

Note:
*¹Alicyclic hydrocarbon resin, produced by Arakawa Rinsan Kogyo Co., Ltd., trade name, "ARUKON P-100"

EXAMPLE 8

The same EEA resin as used in Example 6 was kneaded with rolls maintained at 80° C. The components shown in Table 8 were then added to 100 parts of EEA and kneaded at 100° C. for 10 minutes using rolls.

The resulting mixture was press molded under conditions of 170° C. and 30 minutes to produce a 3 mm thick plate at a test piece.

The test results obtained are shown in Table 8 below.

TABLE 8

|  | Test Nos. | | | | |
|---|---|---|---|---|---|
|  | 1 | 2 | 3 | 4 | 5 |
| Components (parts) | | | | | |
| EEA709 | 100 | 100 | 100 | 100 | 100 |
| BT1015 |  | 5 | 10 | 10 | 10 |
| DCPO |  |  | 1 | 1 | 1· |
| Iron acetylacetone |  |  |  |  | 0.05 |
| Tensile Strength (kg/mm²) | | | | | |
| Elongation 100% | 0.16 | 0.17 | 0.17 | 0.19 | 0.20 |
| Elongation 300% | 0.20 | 0.30 | 0.36 | 0.42 | 0.46 |
| At break | 0.32 | 0.58 | 0.65 | 0.60 | 0.66 |
| Tensile Elongation at Break % | 720 | 540 | 530 | 430 | 430 |

Test Nos. 1 and 2: Comparison
Test Nos. 3–5: Invention

While the invention has been described in detail and with reference to specific examples thereof, it will be apparent to one skilled in the art that various changes and modifications can be made therein without departing from the apirit and acope thereof.

What is claimed is:

1. A hot melt adhesive composition consisting essentially of
   (A) 99 to 80 wt % of an ethylene-vinyl acetate copolymer,
   (B) 1 to 20 wt % of a monofunctional or polyfunctional cyanate ester compound having at least one cyanate group in the molecule, and
   (C) a monofunctional or polyfunctional maleimide compound or a cross-linking catalyst for the ethylene-vinyl acetate copolymer (A) in an amount of from 0.1 to 5% by weight based on the weight of the component (A) and the component (B).

2. The composition as claimed in claim 1, wherein the amount of the ethylene-vinyl acetate copolymer is 95 to 85 wt %.

3. The composition as claimed in claim 1, wherein the ethylene-vinyl acetate copolymer has a vinyl acetate content of 8 to 50 wt %.

4. The composition as claimed in claim 3, wherein the vinyl acetate content is 25 to 40 wt %.

5. The composition as claimed in claim 1, wherein the monofunctional or polyfunctional cyanate ester compound having at least one cyanate group in the molecule is represented by the formula R(OCN)m wherein m is an integer of 1 or more, R is an aromatic organic group, and the cyanate group is bonded to an aromatic ring of the aromatic organic group.

6. The composition as claimed in claim 1, wherein the monofunctional or polyfunctional maleimide compound is a compound having at least one N-maleimide group in the molecule.

7. The composition as claimed in claim 1, wherein the cross-linking catalyst for the ethylene-vinyl acetate copolymer is selected from the group consisting of an organic peroxide, sulfur and an organometallic salt.

* * * * *